S. P. PARHAM.
Gas Regulator.
No. 12,692.
Patented April 10, 1855.
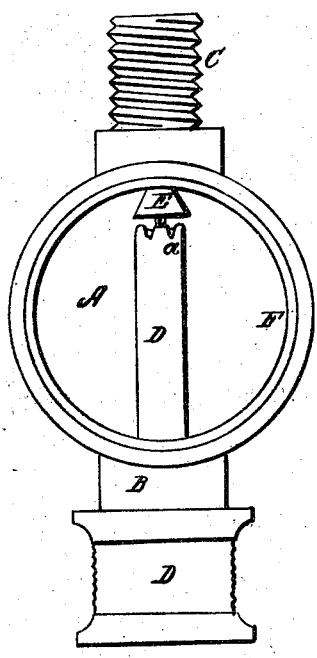
Fig: 1.
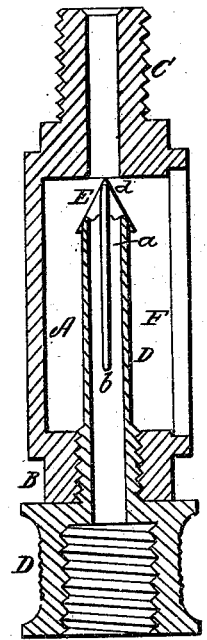
Fig: 2.
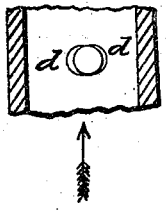
Fig: 3.

UNITED STATES PATENT OFFICE.

SAML. P. PARHAM, OF TRENTON, NEW JERSEY.

IMPROVED GAS-REGULATOR.

Specification of Letters Patent No. 12,692, dated April 10, 1855.

*To all whom it may concern:*

Be it known that I, SAMUEL P. PARHAM, of Trenton, in the county of Mercer and State of New Jersey, have invented a new and useful Apparatus for Regulating and Equalizing the Flow of Air, Gas, or Water Under a Varying Pressure; and I do hereby declare that the same is described and represented in the following specifications and drawings.

To enable others skilled in the art to make and use my invention I will proceed to describe its construction and operation referring to the drawings in which the same letters indicate like parts in each of the figures.

Figure 1, is an elevation of my regulator the front plate being omitted to show the interior. Fig. 2, is a section of Fig. 1, cut perpendicularly through the center.

The nature of my invention consists in the arrangement of a valve in a cistern between the orifices of the supply and discharge pipe, so that as the pressure from the supply pipe increases it forces the valve into the discharge pipe partially closing it, thereby preventing too great a discharge; but if the pressure on the supply pipe diminishes the valve descends, so as to increase the opening into the discharge pipe, so as to let more of the material passing through the regulator escape, thereby regulating the amount of material passing out of the discharge pipe, or in through the supply pipe so as to make the amount uniform under different degrees of pressure.

In the accompanying drawings A is a circular cistern provided with stems or pipes B and C. The pipe B is provided with a female screw to which the male screw of the supply pipe D is fitted. This supply pipe is enlarged at its lower end and provided with a female screw to fasten it to the pipe furnishing the material to pass through the regulator. The upper end of the pipe D is beveled to fit the interior of the conical valve E and is provided with one or more scores *a* intended to allow sufficient gas to pass to supply the light or burner when the pressure is reduced so low as to let the valve E settle onto the pipe D. The valve E is made in the form of a hollow cone as represented and provided with a long stem *b* which extends down into the supply pipe D and serves to prevent the valve from getting out of place, while it allows it to rise up into the opening of the discharge pipe so as to partially close it, when there is a high pressure upon the gas passing through the supply pipe D.

The opening into the discharge pipe C is made a little elliptical by being cut away a little on two sides as represented at *d*, so as to let sufficient gas pass to supply the burner when the pressure on the gas issuing from the supply pipe is sufficient to force the valve up into the opening of the pipe C, which pipe is provided with a male screw for the purpose of affixing a burner.

In Fig. 1, the valve E is represented as forced up into the discharge pipe and in Fig. 2, as resting upon the supply pipe. A face plate of glass or metal should be fitted to the rebate F and fastened in by burnishing over the edge of the rebate or by soldering or cementing it in or otherwise. The valve E should be made of thin sheet metal and the weight of the valve and stem should be proportioned to the size of the pipes, pressure of the gas or other material and the quantity intended to be furnished through the regulator.

The foregoing description is intended to show that when the pressure on the supply pipe is increased, it raises the valve E and partially closes the opening into the discharge pipe and if the pressure diminishes the valve descends thereby regulating and graduating the escape of the gas more perfectly than any other apparatus heretofore used and furnishing a more uniform supply under different degrees of pressure.

Although I have described my apparatus as applied to regulate the supply of gas to a burner or burners, I contemplate that it may be usefully applied to equalize the flow of the various kinds of gases, steam, water and other liquids under different degrees of pressure. Also that its construction may be varied in various ways which will readily suggest themselves to intelligent machinist, and that the orifices of the supply and discharge pipes may be placed in a different position in relation to each other from the one represented, and a valve applied to each, and connected by a lever or levers, so that the valve over the supply pipe may be made to operate the valve of the discharge pipe.

What I claim as my invention and desire to secure by Letters Patent in the above described apparatus is—

A conical valve or its equivalent operated by a jet of air, gas or water applied immediately under it or against a cap or valve connected to it, in combination with an elliptical seat or its equivalent so constructed as to let the requisite supply of air, gas or water escape when the valve is forced into the seat; the whole being so constructed and arranged as to regulate and equalize the flow of air, gas or water and furnish a uniform or nearly uniform supply under different degrees of pressure substantially as described.

SAML. P. PARHAM.

Witnesses:
I. DENNIS, Jr.,
SAML. GRUBB.